US006143987A

United States Patent [19]

Makita

[11] Patent Number: 6,143,987

[45] Date of Patent: *Nov. 7, 2000

[54] STRUCTURE FOR WATERPROOFING AN END PORTION OF A CABLE

[75] Inventor: Yasumitsu Makita, Yokkaichi, Japan

[73] Assignee: Sumitomo Wiring Systems, Ltd., Japan

[ * ] Notice: This patent issued on a continued prosecution application filed under 37 CFR 1.53(d), and is subject to the twenty year patent term provisions of 35 U.S.C. 154(a)(2).

[21] Appl. No.: 09/140,550

[22] Filed: Aug. 26, 1998

[30] Foreign Application Priority Data

Feb. 9, 1997 [JP] Japan .................................... 9-237255

[51] Int. Cl.[7] .................................................... H02G 15/02

[52] U.S. Cl. ........................................ 174/74 R; 174/77 R

[58] Field of Search ............................... 174/74 R, 75 C, 174/78, 60, 65 R, 84 R, 88 R, 65 G, 153 G, 152 G, 77 R; 439/98, 99; 248/56; 16/2.1, 2.2

[56] References Cited

U.S. PATENT DOCUMENTS

| | | | |
|---|---|---|---|
| 2,954,420 | 9/1960 | Logan | 174/75 C |
| 3,295,076 | 12/1966 | Kraus | 174/75 C X |
| 3,598,895 | 8/1971 | Garland | 174/75 C X |
| 3,982,060 | 9/1976 | Avery et al. | 174/75 C |
| 4,337,603 | 7/1982 | Davidson | 248/56 X |
| 4,901,395 | 2/1990 | Semrau | 174/152 G X |
| 5,267,878 | 12/1993 | Shinji et al. | 439/98 X |

FOREIGN PATENT DOCUMENTS

| | | |
|---|---|---|
| 0 542 102 | 5/1993 | European Pat. Off. . |
| 0694989 | 1/1996 | European Pat. Off. . |
| 0817316 | 1/1998 | European Pat. Off. . |
| 5-251116 | 9/1993 | Japan . |

OTHER PUBLICATIONS

European Search Report EP 98 30 6334 dated Apr. 20, 2000.

*Primary Examiner*—Kristine Kincaid
*Assistant Examiner*—Chau N. Nguyen
*Attorney, Agent, or Firm*—Banner & Witcoff, Ltd.

[57] ABSTRACT

An electric wire 10 is provided with a shielding layer 12 inside an outer sheath 11, three insulated wires 13 being provided therein. A correcting ring 46 is inserted between the outer sheath 11 and the shielding layer 12 of the electric wire 10, correcting the outer sheath 11 into a circular shape. A waterproofing ring 39 is attached tightly to an outer peripheral face of the outer sheath 11. In this way, even in the case where the shape of the outer sheath 11 of the electric wire 10 provided with a plurality of insulated wire cores 13 tends to be unstable, the electric wire 10 can be maintained in a specified shape by the correcting ring 46. Consequently the waterproofing ring 39 can fit stably and tightly to the outer peripheral face of the electric wire 10, thereby improving the waterproofing function.

16 Claims, 4 Drawing Sheets

STRUCTURE FOR WATERPROOFING AN END PORTION OF A CABLE

The present invention relates to a waterproofing structure for an electric wire terminal.

The increased diversity of uses of electrical appliances in recent years has given rise to a greater need for said appliances to be waterproofed. Conventionally, the interface between an electrical appliance and an electric wire terminal has been waterproofed by providing a waterproofing ring. Said waterproofing ring covers an outer peripheral face of an outer sheath of the electric wire and an inner peripheral face of an electric wire insertion hole provided in a housing of the electrical appliance.

However, a conductor provided inside the outer sheath of the electric wire may shift, and thus cause the external shape of the outer sheath to change. This in turn causes the waterproofing ring to become less tightly fitted, and thus lowers its waterproofing efficiency. Further, as shown in FIG. 6, in the case of a triple core wire 3 consisting of three insulated wire cores 1 covered by an outer sheath 2, the external shape of the outer sheath 2 is schematically triangular, and gaps occur between it and the round waterproofing ring. As a result, adequate waterproofing is extremely difficult to achieve. In order to make the external shape of the triple core wire round, wire rods made from polypropylene have been used, for example, to fill in the inner side of the outer sheath 2, but this has met with only limited success.

The present invention has been developed after taking the above problem into consideration, and aims to present a means to waterproof an electric wire terminal in which the space between the electric wire terminal and the housing which houses it is waterproofed reliably.

SUMMARY OF THE INVENTION

According to the present invention there is provided apparatus for sealing an insulated wire in an aperture, the wire having inner and outer protective sheaths, characterized in that a resilient tubular member is provided between the inner and outer sheaths to bias the outer sheath against the aperture.

The present invention thus provides a means for conforming the outer protective layer of the insulated wire to the shape of the aperture. The tubular member further serves to centralize the wire within the aperture.

The apparatus may further comprise a resilient member and a housing wherein the resilient member defines the aperture and is provided within the housing.

In a preferred embodiment the tubular member is split. This allows the tubular member to be compressed, and hence its cross-sectional dimensions to be reduced, to aid its insertion between the protective layers. The tubular member may be formed from metal or from a plastics material and, in one embodiment, may be integral with a wire end connector.

DESCRIPTION OF THE DRAWINGS

The present invention will now be described with reference to the accompanying drawings in which.

Figure 2:
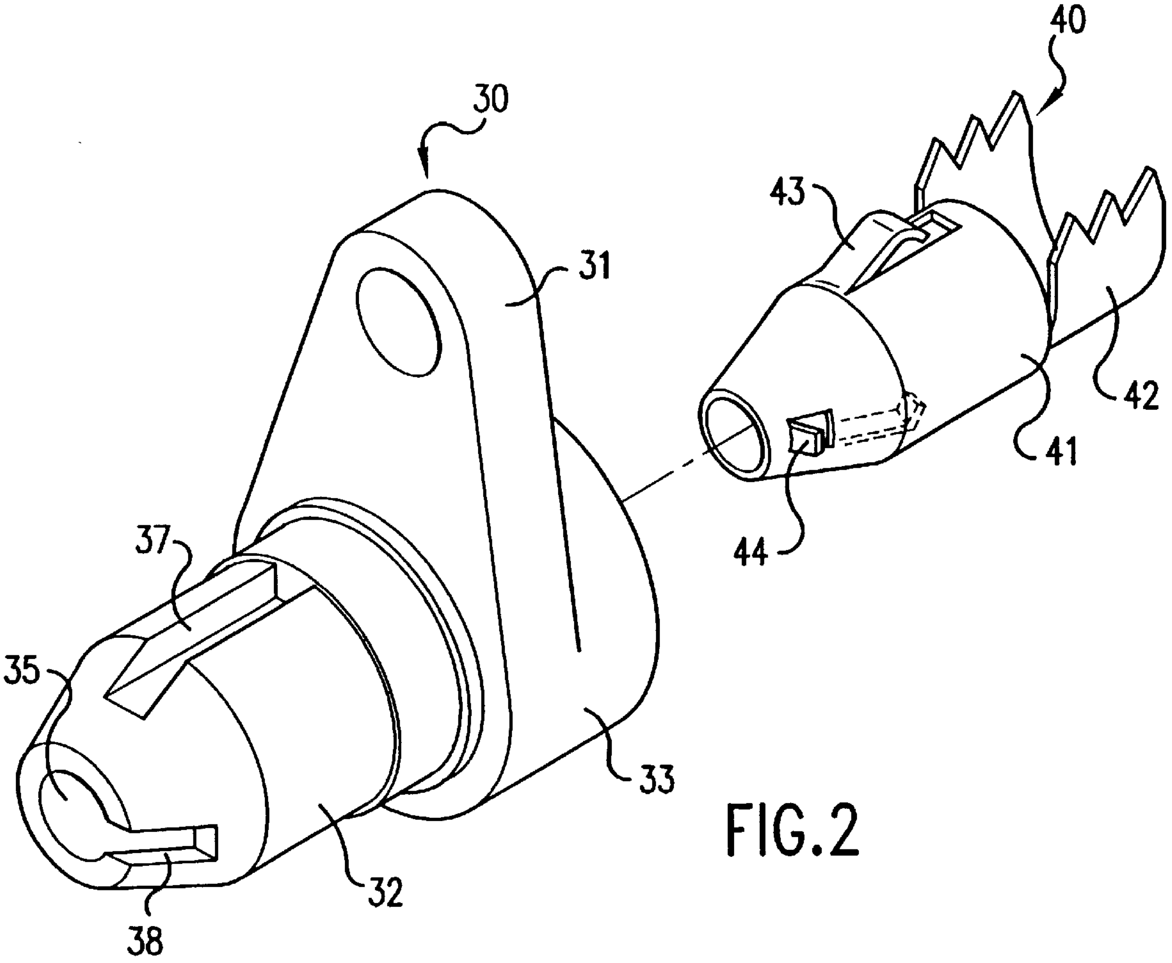
FIG. 2 shows a perspective view of a holder and on earthing member of the above.
Figure 3:
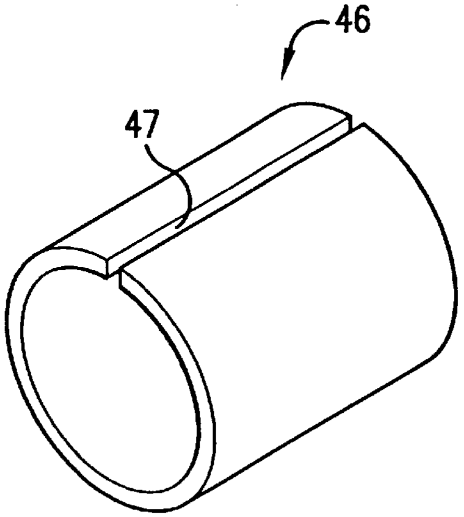
FIG. 3 shows a perspective view of a correcting ring according to a first embodiment of the present invention.

A first embodiment of the present invention is described below with reference to FIGS. 1 to 3. A shielded electric wire 10 is provided with a shielding layer 12 made from braided wire on the inner side of an outer sheath 11, and three insulated wire cores 13. Each insulated wire core 13 comprises a conductor 13A covered by an insulator 13B. The waterproofing configuration of the present embodiment is suitable for use as a terminal which earths the shielding layer 12 of the electric wire 10 to a body 20.

A portion of the body 20 has a circular aperture 21 passing therethrough with a holder 30 being located therein. As shown in FIG. 2, the holder 30 is of a substantially tubular shape which is tapered at its anterior end, its central portion in the direction of its axis having an attachment plate 31 protruding therefrom. As shown in FIG. 1, a smaller diameter portion 32 located on the anterior side of the attachment plate 31 is inserted into the aperture 21 from the external side (the left side in FIG. 1) of the body 20. The attachment plate 31 is brought into contact with the body 20, and a bolt 33 (see FIG. 1) is passed through one end of the attachment plate 31, thereby fixing the attachment plate 31 in place by tightening the bolt 33 into a female screw hole 22 formed in the body 20. A rubber ring 34 is provided on the outer peripheral face of a base end member of the small diameter portion 32. The outer peripheral face of the small diameter portion 32 and the inner peripheral face of the aperture 21 thus fit tightly together and result in the open end of the outer side of the aperture 21 being waterproofed.

A through hole 35 is provided along the longitudinal axis of the holder 30, the terminal end of the electric wire 10 passing therethrough. The outer sheath 11 is peeled away from the electric wire 10, leaving the shielding layer 12 exposed. At the anterior end of the electric wire 10, the shielding layer 12 is also peeled away, leaving the three insulated wire cores 13 exposed. The electric wire 10 is passed through the through hole 35 from the posterior side (the left side in FIG. 1) of the holder 30, with only the insulated wire cores 13 protruding from the anterior end face of the holder 30. Further, the electric wire 10 is waterproofed by a larger diameter member 36 at the posterior side of the holder 30, and is earthed at the anterior side by the smaller diameter portion 32.

The smaller diameter portion 32 of the holder 30 houses an earthing member 40 which earths the electric wire 10 within the smaller diameter portion 32. The earthing member 40 is made from an electrically conductive metal plate and, as shown in FIG. 2, is provided with a cylindrical tubular portion 41 which is tapered at its anterior end and fits with the smaller diameter portion 32. The posterior end of the tubular portion 41 extends to form a barrel member 42 which, in use, clamps the electric wire 10. As shown in FIG. 1, the electric wire 10 passes from the barrel member 42 into the tubular portion 41, with only the insulated wire cores 13 protruding from the anterior end of the tubular portion 41. The shielding layer 12 of the electric wire 10 is clamped and fixed in place by the barrel member 42. A pair of resilient lances 43, located at an angle of 180° with respect to each other, are cut out on the peripheral faces of the tubular portion 41, these resilient lances 43 moving resiliently in the diametrical direction of the tubular portion 41. The resilient lances 43 protrude from the holder 30 via a pair of slits 37 formed on the smaller diameter portion 32 of the holder 30 so as to make contact with the body 20. As a result, the shielding layer 12 is earthed by the body 20. Further, a stopping member 44 (see FIG. 2) is formed by cutting out a portion of the anterior end of the tubular portion 41 of the earthing member 40, this stopping member 44 being stopped by a stopping groove 38 formed on the smaller diameter portion 32 of the holder 30. Consequently, the earthing member 40, in use, is retained in the smaller diameter portion 32 of the holder 30.

Figure 1:
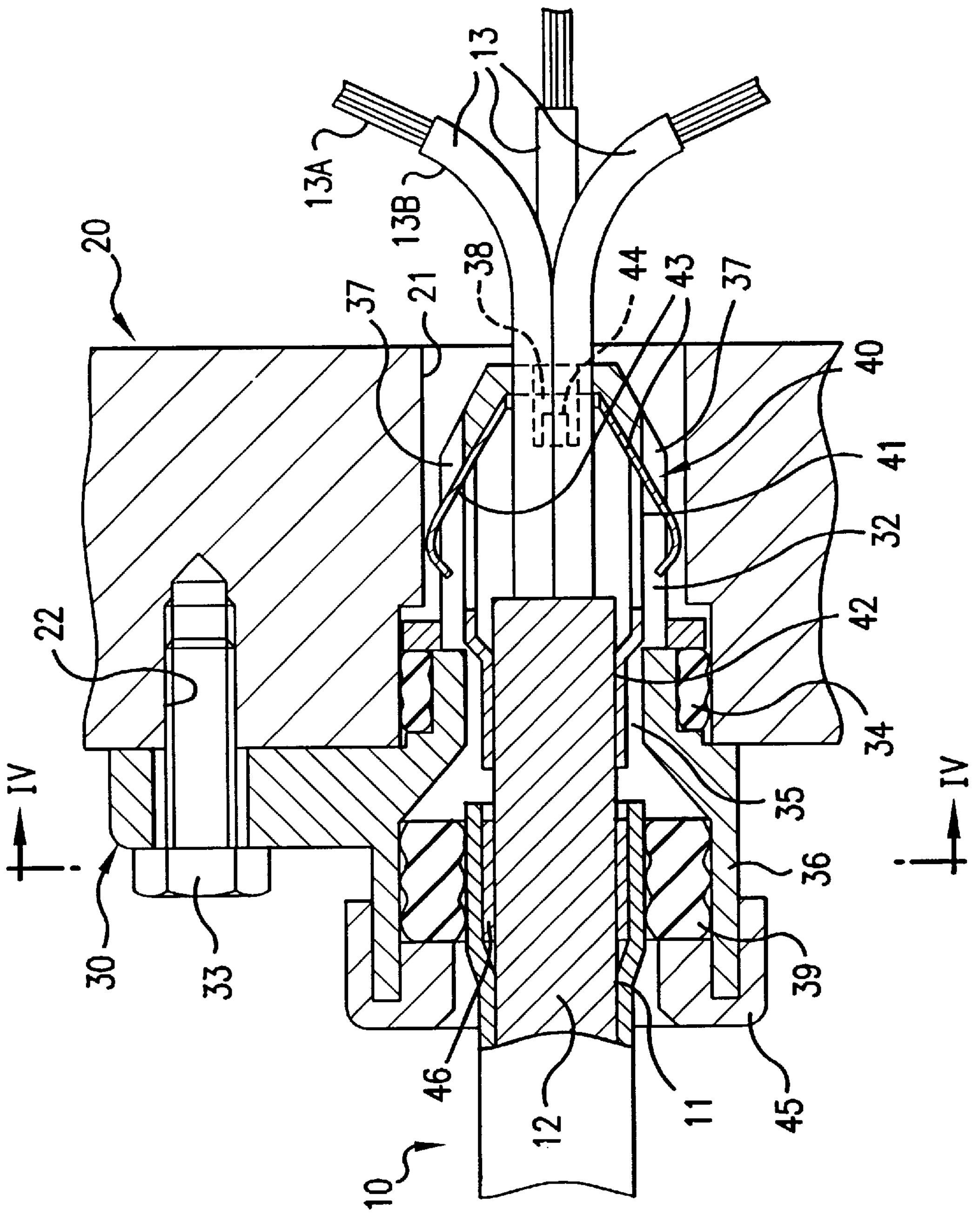
FIG. 1 shows a cross-sectional view of a wire attachment member.

As shown in FIG. 1, the larger diameter portion 36 of the holder 30 carries a waterproofing ring 39 which waterproofs the space between the holder 30 and the electric wire 10. The ring 39 is fitted within the end of the larger diameter portion 36 and is prevented from being removed by means of a cap 45. The end of the outer sheath 11 of the electric wire 10 is located within this larger diameter portion 36, the outer peripheral face of the outer sheath 11 fitting tightly with the waterproofing ring 39.

Figure 4:
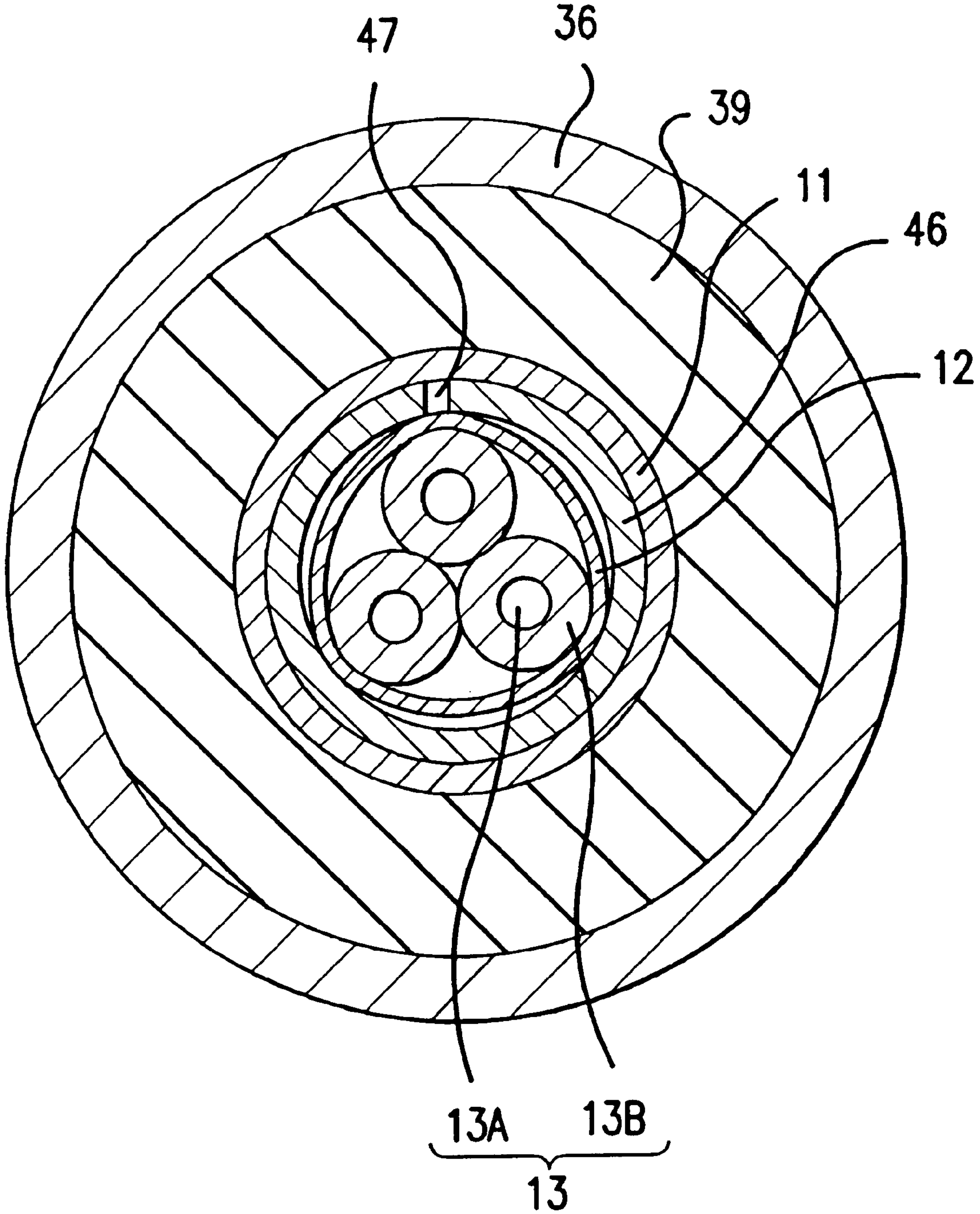
FIG. 4 shows a cross-sectional view of IV—IV of FIG. 1.

As shown in FIGS. 1 and 4, at the end of the outer sheath 11 of the electric wire 10 a correcting ring 46 is inserted between the outer sheath 11 and the shielding layer 12. The correcting ring 46 is made from a resilient material e.g. metal and, as shown in FIG. 3, is tubular in shape. A slit 47 in its peripheral face is open from its anterior to posterior ends, the slit 47 enabling the diameter of the correcting ring to be altered.

Next, the operation and effects of the present embodiment, configured as described above, are explained.

In order to attach the electric wire 10 to the holder 30, the correcting ring 46 is first attached to the end of the electric wire 10. At this point, the slit 47 of the correcting ring 46 can be made narrower and the correcting ring 46 will correspondingly decrease in diameter. Consequently, the correcting ring 46 can be inserted into the outer sheath 11 without making the outer sheath 11 any larger. Once inserted the radius of the correcting ring 46 increases and it returns to its original shape within the outer sheath 11; this returning force exerting tension on the outer sheath 11 to increase its radius, thus correcting the outer sheath 11 to a circular shape.

In this state, the cap 45, the waterproof ring 39, and the earthing member 40 are attached in turn from the anterior end of the electric wire, the barrel member 42 of the earthing member 40 being clamped to the shielding member 12. These are then inserted into the holder 30, the cap 45 being fitted to the anterior end thereof. Next, the larger diameter portion 36 of the holder 30 is fitted with the waterproofing ring 39, the end of the outer sheath 11 of the electric wire 10 being located at the inner side of the waterproofing ring 39. As shown in FIG. 4, the correcting ring 46 corrects the end of the outer sheath 11 to a circular shape of a specified size, and the waterproofing ring 39 and the outer sheath 11 are thereby stabilised and maintained in a tightly fitted state. Further, since the inner periphery of the waterproofing ring 39 is stable and fits tightly, the outer periphery of the waterproofing ring 39 and the inner peripheral face of the holder 30 also join in a stable manner. Consequently, water can reliably be prevented from entering the body 20 via the space between the electric wire 10 and the holder 30.

Finally, the holder 30 is attached to the aperture 21 of the body 20. Thus the inner peripheral face of the insertion through hole 21 is attached to the resilient members 43 of the earthing member 40, the shielding layer 12 being earthed by the body 20, and the rubber ring 34 is fitted to the holder 30 making the outer opening of the aperture 21 waterproof. In this manner, water is prevented from entering the aperture 21.

In this way, according to the waterproofing means of the present embodiment, even though the shape of the outer sheath 11 tends to be unstable in the case of an electric wire 10 provided with a plurality of insulated wire cores 13, said sheaths 11 can be maintained in a specified shape by the correcting ring 46 and consequently the waterproofing ring 39 can fit stably and tightly to the outer peripheral face of the electric wire 10, thereby improving the waterproofing function. Further, the correcting ring 46 of the present embodiment is provided with a slit 47 which allows the radius of the correcting ring 46 to be decreased. Consequently, the correcting ring 46 is easily inserted into the interior of the outer sheath 11.

Furthermore, the present invention is not limited to the embodiment described above with the aid of figures. For example, the possibilities described below also lie within the technical range of the present invention. In addition, the present invention may be embodied in various other ways without deviating from the scope thereof.

(1) In the present embodiment, the correcting ring 46 is made from resilent metal. However, it may equally well be made from a resilent plastics material, for example resin. Further, it may equally well be without the slit 47 which allows it shape to be adjusted.

(2) Moreover, the correcting ring 46 of the present embodiment has a cylindrical shape which corresponds to the shape of the inner peripheral face of the housing (the larger diameter portion 36). However, the inner peripheral face of the housing may equally well be, for example, oval in shape and, correspondingly, the correcting ring may be oval.

Figure 5:
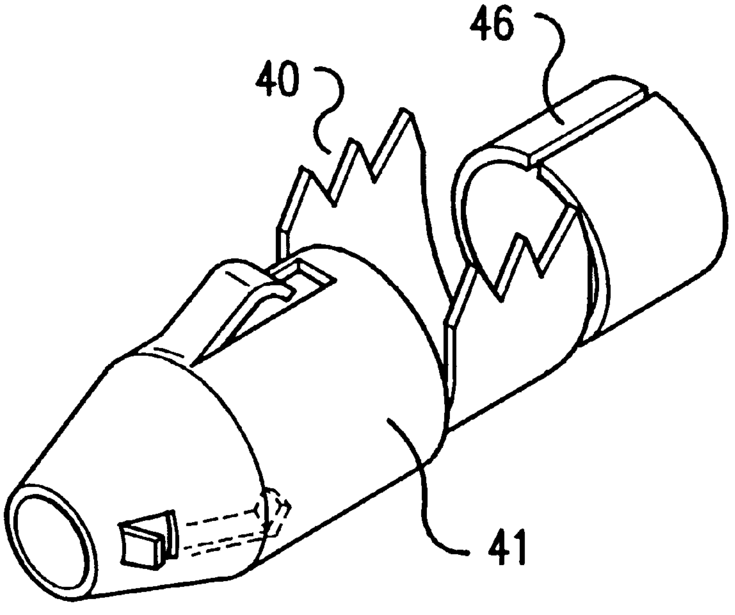
FIG. 5 shows a perspective view showing a combined earthing member and correcting ring according to a second embodiment of the present invention.
Figure 6:
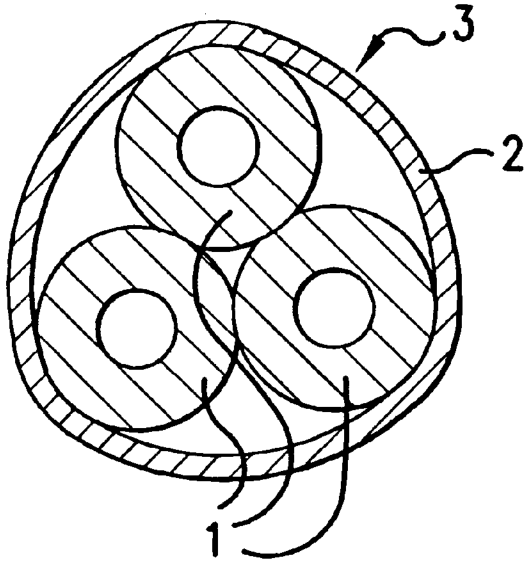
FIG. 6 shows a cross-sectional view of a multiple core wire.

(3) The correcting ring 46 of the present embodiment may equally well be formed in a unified manner with the earthing member 40 shown, for example, in FIG. 5. In this case, the number of components is reduced and the operator can insert the outer sheath 11 into the correcting ring 46 after supporting the tubular member 41 of the earthing member 40. Consequently, the operation becomes easier.

What is claimed is:

1. Apparatus for sealing an insulated wire in a body, said body having an inner surface defining a hole through which said insulated wire passes, said insulated wire having an inner and an outer protective sheath, said apparatus comprising a peripheral seal for extending between said outer sheath and said inner surface of said body, and a resilient tubular member having an outer surface shaped for corresponding to the shape of the hole, the tubular member for being provided between said inner and outer sheaths to bias the outer sheath outwardly against said peripheral seal in use.

2. Apparatus as claimed in claim 1 wherein the tubular member has a wall and said wall is split.

3. Apparatus as claimed in claim 2 wherein the tubular member has a longitudinal axis and said split extends in the direction of said axis.

4. Apparatus as claimed in claim 1 wherein the tubular member is integral with a terminal.

5. Apparatus as claimed in claim 1 wherein the tubular member is circular in cross-section.

6. Apparatus as claimed in claim 1 wherein the tubular member has planar end faces, and said end faces are parallel.

7. Apparatus as claimed in claim 1 wherein the tubular member is straight.

8. Apparatus as claimed in claim 1 wherein the tubular member is made from metal.

9. Apparatus as claimed in claim 1 wherein the tubular member is made from a plastics material.

10. Apparatus for sealing an insulated wire in a hole of an element in a body, said insulated wire having an inner shielding layer of braided wire and an outer insulative layer, said apparatus comprising a resilient tubular member including an outer surface shaped to correspond to the shape of the hole and a longitudinal slit extending therethrough, said tubular member for being provided between said inner shielding layer and said outer insulative layer to bias said outer insulative layer outwardly against an inner surface of the hole in use.

11. Apparatus as claimed in claim 10 wherein the tubular member is integral with a terminal.

12. Apparatus as claimed in claim 10 wherein the tubular member is circular in cross-section.

13. Apparatus as claimed in claim 10 wherein the tubular member has planar end faces, and said end faces are substantially parallel.

14. Apparatus as claimed in claim 10 wherein the tubular member is straight.

15. Apparatus as claimed in claim 10 wherein the tubular member is made from metal.

16. Apparatus as claimed in claim 10 wherein the tubular member is made from a plastics material.

* * * * *

UNITED STATES PATENT AND TRADEMARK OFFICE

CERTIFICATE OF CORRECTION

PATENT NO. : 6,143,987
DATED : November 7, 2000
INVENTOR(S) : Yasumitsu Makita

It is certified that error appears in the above-identified patent and that said Letters Patent is hereby corrected as shown below:

Title page,
Under Item [30], Foreign Application Priority Data:

"Feb. 9, 1997" has been replaced with -- Sept. 2, 1997 --.

Signed and Sealed this

Twentieth Day of November, 2001

*Attest:*

Nicholas P. Godici

NICHOLAS P. GODICI

*Attesting Officer* *Acting Director of the United States Patent and Trademark Office*